United States Patent [19]

Pryor et al.

[11] 3,810,287

[45] May 14, 1974

[54] COMPOSITE ROD OR WIRE

[75] Inventors: Michael J. Pryor, Woodbridge; Joseph Winter, New Haven; Julius C. Fister, Jr., Hamden, all of Conn.

[73] Assignee: Olin Corporation, New Haven, Conn.

[22] Filed: June 9, 1972

[21] Appl. No.: 261,376

[52] U.S. Cl. .................................. 29/191.6, 29/197

[51] Int. Cl. .................................. B21c 37/00

[58] Field of Search .................................. 29/191.6, 197

[56] References Cited

UNITED STATES PATENTS

| | | | |
|---|---|---|---|
| 1,637,033 | 7/1927 | Basch | 29/197 |
| 2,473,888 | 6/1949 | Jordan et al. | 29/197 UX |
| 3,395,443 | 8/1968 | Polinko, Jr. | 29/197 X |
| 2,100,258 | 11/1937 | Larson | 29/197 |
| 2,612,682 | 10/1952 | Burrack | 29/197 X |
| 2,752,667 | 7/1956 | Schaefer et al. | 29/197 X |
| 867,659 | 10/1907 | Hoopes et al. | 29/191.6 |
| 3,636,242 | 1/1972 | Hansson | 29/197 X |

*Primary Examiner*—A. B. Curtis
*Assistant Examiner*—O. F. Crutchfield
*Attorney, Agent, or Firm*—Robert H. Bachman

[57] ABSTRACT

A composite, preferably rod or wire, having a first component core of aluminum or an aluminum alloy clad with a second component of copper or a copper alloy, wherein a third component diffusion barrier of nickel, cobalt or an alloy thereof is sandwiched between said first and said second component and bonded thereto.

5 Claims, 2 Drawing Figures

COMPOSITE ROD OR WIRE

BACKGROUND OF THE INVENTION

The present invention relates to the art of making copper clad aluminum rod or wire comprising a core element of aluminum coated with a copper cladding. Specifically, copper clad aluminum wire is widely used in CATV applications where it provides the electrical conductivity of the copper skin to yield a high frequency skin effect combined with the more favorable economies of aluminum. Copper clad aluminum wire is also used in the generic field of building wire where it provides commercial economy for equivalent bulk conductivity as compared with copper or copper alloys, and in addition shows improved contact resistance and surface stress relaxation characteristics. Copper clad aluminum wires also have the particular advantage of comparably low specific weight. Thus, the copper clad aluminum wires are desirable commercially since they combine the relatively inexpensive aluminum with the good electric properties of copper.

The wide spread acceptability of copper clad aluminum wires is inhibited by the fact that interdiffusion is accelerated between the copper cladding and the aluminum core at temperatures above 300°F. This leads to the formation of brittle copper aluminum intermetallics at the interface between the core and the cladding. The intermetallics which form have relatively high resistance and poor deformation characteristics so that parting of the copper and aluminum can occur in flexing operations and in fact may represent a significant problem. This may present an even greater problem since normal wire usage often involves bending and/or flexing and/or vibration. Furthermore, the relatively high electrical resistivity of the intermetallic compounds prevents free transfer of electric current from skin to the aluminum core.

The formation of these brittle intermetallic compounds has lead to the use of numerous inconvenient expedients in order to avoid their formation. For example, copper clad aluminum wires are frequently batch annealed for relatively long periods of time at relatively low temperatures. The batch annealing process is a relatively slow one and is also quite expensive economically. In addition, one may employ closely regulated inline resistance annealing as disclosed in U.S. Pat. No. 3,537,493 or high frequency electric circuits as disclosed in U.S. Pat. No. 3,499,804. Furthermore, this does not solve the problem of intermetallic compound formation in usage.

Obviously, it is highly desirable to provide an article which is not subject to the inconvenient and undesirable intermetallic formation while retaining the highly desirable characteristics of copper clad aluminum products, such as rod, wire, bus bars, ribbons, etc.

Accordingly, it is a principal object of the present invention to provide an improved copper clad aluminum product, especially rod or wire.

It is a further object of the present invention to provide an improved rod or wire as aforesaid which is not subject to the undesirable brittle intermetallic compound formation between core and cladding.

It is a still further object of the present invention to provide an improved rod or wire as aforesaid which is inexpensive and convenient to produce and which is characterized by properties comparable to commercial copper clad aluminum rod or wire.

Further objects and advantages of the present invention will appear hereinbelow.

SUMMARY OF THE INVENTION

In accordance with the present invention it has now been found that the foregoing objects and advantages may be readily achieved. In the broadest embodiment, the present invention comprises a composite having a first component selected from the group consisting of aluminum and aluminum base alloys clad with a second component selected from the group consisting of copper and copper base alloys, and as a third component sandwiched between said first and said second component and bonded thereto, a material selected from the group consisting of nickel, cobalt and alloys thereof. In the composite rod or wire of the present invention, the first component is the core clad with the second component, wherein the third component represents the surprisingly effective diffusion barrier of the present invention.

Figure 1:
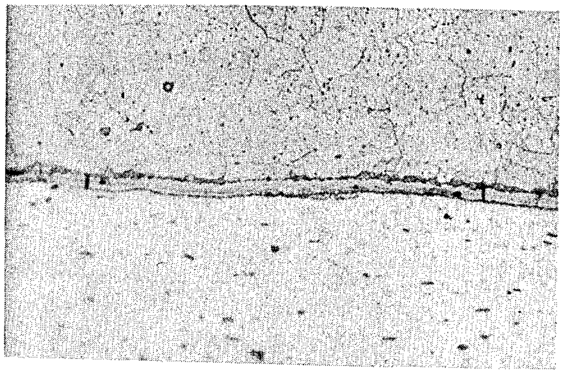
FIG. 1 is a photomicrograph at a magnification of 1000X showing a copper aluminum composite with the formation of a brittle aluminum-copper intermetallic compound.

These photomicrographs will be discussed in more detail hereinbelow.

DETAILED DESCRIPTION

The composite of the present invention utilizes aluminum or an aluminum base alloy as the core. Any desired aluminum alloy may be readily employed such as, for example, high purity aluminum, commercial purity aluminum, electrical conductivity grade (EC) aluminum, or aluminum alloys such as aluminum alloy 1100, 6061, 3003, 3004, etc. Typical alloying substituents include but are not limited to the following: manganese, tin, copper, magnesium, silicon, iron, chromium, zinc and etc.

Similarly, any desirable copper or copper alloy material may be readily used as cladding. Typical cladding materials which may be employed include but are not limited to the following: high purity copper, tough pitch copper, conventional brasses and bronzes, and deoxidized grades of copper, such as OFHC copper phosphorus deoxidized copper, boron deoxidized copper, calcium deoxidized copper, misch metal deoxidized copper and so forth. Typical alloying substituents include but are not limited to the following: aluminum, iron, silicon, lead, phosphorus, silver, gold, platinum, paladium, tin, nickel and zirconium. Zinc represents a particularly important alloying substituent. In a like manner one may utilize any desired cobalt or cobalt base alloy or nickel or nickel alloy as a diffusion barrier therein. For example, the cobalt or cobalt base alloy or nickel or nickel alloy may be high purity nickel or cobalt, commercial purity nickel, cobalt or a nickel or cobalt alloy containing one or more of the following additions: aluminum, cobalt, nickel, iron, copper, manganese, silicon, carbon, sulfur or chromium. Alternatively, one may readily utilize the nickel or cobalt resulting from a plating bath. With respect to the nickel alloy, while nickel base alloys are preferred, one may utilize any nickel alloy containing over 15 percent nickel, such as the cupronickels, for example, alloy 715 containing about 30 percent nickel or alloy 720 containing about 40 percent nickel.

In the preferred embodiment the aluminum core is 1100 aluminum or EC grade aluminum and the copper cladding is copper alloy 110 or OFHC copper and the barrier layer is commercial purity nickel. Nickel represents the preferred embodiment and the ensuing discussion will refer thereto.

In accordance with the present invention, the copper clad aluminum rod or wire may be prepared by any desirable process. It is preferred in accordance with the present invention to utilize the process described in U.S. Pat. No. 3,509,617. This process forms an assembly by placing the core inside the cladding and reducing the assembly diameter from 10 to 70 percent by rotary swaging. However, it should be readily understood that the composite of the present invention may be conveniently formed by other desirable methods. For example, when a strip or sheet product is desired, the components may simply be rolled together. The copper and nickel components may be preliminarily bonded by rolling, or all components may, be rolled together simultaneously. The nickel component may, alternatively, be provided by plating.

In the ensuing discussion, unless otherwise stated, all ranges of components are by cross-sectional area.

Thus in accordance with the present invention, it is preferred to provide an incoming rod of aluminum having a diameter of from 0.5 to 2.5 inches in long continuous lengths. Copper strip upon which has been clad a layer of nickel ranging in thickness from as low as 5–10 microns to about 20 percent of the thickness of the copper strip is formed around the aluminum rod, with the nickel clad surface being innermost. As can be seen, a very thin nickel layer may be provided, such as from 5 to 10 microns, or a thicker layer may be provided, depending generally upon the manner in which the nickel layer is applied. The important feature is to provide a nickel layer having sufficient thickness to provide a continuous barrier layer.

The nickel clad copper strip is then welded around the aluminum rod, for example, using tungsten arc welding with or without a copper filler. The loose assembly may be then firmly bonded such as by swaging in accordance with the procedure in the aforesaid U.S. Pat. No. 3,509,617, into a metallurgically bonded rod in accordance with the present invention.

It should be understood that the foregoing procedure is intended to be representative only and as indicated above other methods of preparation may be utilized.

The metallurgically bonded rod may then be drawn to any desirable wire gage by any method. For example, redraw rod having a diameter of from one-half to three-eighths inch may be readily formed and drawn down to B & S wire gages and down to magnet wire. The resultant conductor wire preferably has a diameter of from 0.002 to 0.375 inch.

In accordance with the present invention the first or aluminum component should represent the major proportion of the area of the composite and the copper and nickel layers should represent the minor proportion of the area of the composite. Thus, the first or aluminum component should represent from 70 to 95 percent of the area of the three components. The second or copper component and the third or nickel components should represent in combination from 5 to 30 percent of the area of the three components, with the third or nickel barrier layer being present in an area of from 5 to 10 microns to 20 percent of the second component.

In accordance with the present invention it has been found that the foregoing composite surprisingly overcomes the significant disadvantages of the art and provides copper clad aluminum wire or rod which is not susceptible to brittle intermetallic compound formation. This represents a significant advance in the art which is achieved by simple, inexpensive and convenient methods.

Naturally, one may readily provide further coatings on the composite of the present invention, such as additional metallic coatings if desirable for a particular purpose or a plastic coating for use in building wire applications where desired.

The present invention and improvements resulting therefrom will be readily understood from a consideration of the following illustrative examples.

EXAMPLE I

Electric conductor grade aluminum (EC) in the form of one inch diameter rod was clad with oxygen free, high conductivity (OFHC) copper in strip form by seam welding a formed strip around the aluminum rod using gas tungsten arc welding. The loose assembly was rotary swaged into a metallurgically bonded rod. The resultant rod had a diameter of about one-half inch.

The metallurgically bonded copper clad aluminum rod was heated at 500°F for one hour. Metallographic examination of the cross-section showed an intermetallic layer approximately 2 microns or more thick between the aluminum and the copper components.

EXAMPLE II

A composite was prepared in a similar manner as in Example I, with the exception that the copper strip was previously coated with a layer of about 40 microns in thickness of commercial purity nickel prior to forming around the aluminum rod. The loose assembly was rotary swaged into a metallurgically bonded rod having a thickness of about one-half inch. The resultant composite rod of the present invention was heated at 500°F for one hour. The metallographic examination of the cross-section showed no intermetallic components.

EXAMPLE III

Figure 2:
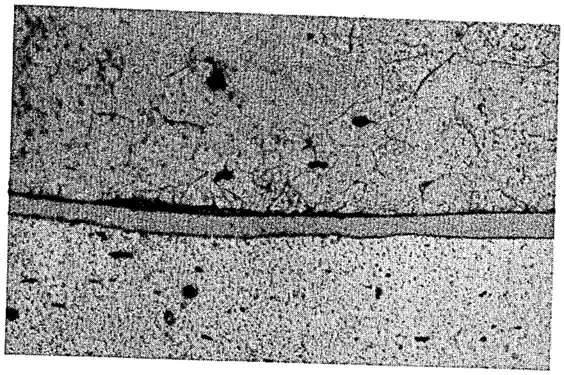
FIG. 2 is a photomicrograph at a magnification of 1000X showing a composite of the present invention without the formation of an intermetallic compound.

In accordance with this example, an aluminum-nickel-copper-aluminum composite was prepared from sheet material by rolling the components together. Aluminum alloy 1100 was used having a composition of about 1.0 percent silicon plus iron, 0.10 percent copper, 0.03 manganese, 0.05 percent zinc, balance essentially aluminum. Copper alloy 110 was used having a composition of about 99.90 percent minimum copper, nominal 0.04 percent oxygen. Commercial purity nickel foil was used having a thickness of 0.002 inch. The components were rolled together in one pass with a reduction of about 60 percent. The resultant composite was firmly bonded. The composite was then annealed at a temperature of 310°C for about 3 hours and subjected to metallographic examination. The resultant metallographic samples showed the expected copper-aluminum intermetallic formation along the copper aluminum interface as shown in FIG. 1. The thickness of this intermetallic zone was 3–4 microns. The aluminum-nickel-copper interface showed no intermetallic formation, as shown in FIG. 2. The nickel barrier layer, as clearly shown in the photomicrograph which is FIG. 2, effectively prevented interdiffusion between the aluminum and the copper components. In the figures, in FIG. 1 the copper component represents the upper most layer, the aluminum component represents the lower most layer and the aluminum-copper intermetallic compound is the center layer. In FIG. 2 the copper represents the upper most layer, the aluminum represents the lower most layer and nickel barrier layer is the center layer between the copper and aluminum components.

This invention may be embodied in other forms or carried out in other ways without departing from the spirit or essential characteristics thereof. The present embodiment is therefore to be considered as in all respects illustrative and not restrictive the scope of the invention being indicated by the appended claims, and all changes which come within the meaning and range of equivalency are intended to be embraced therein.

What is claimed is:

1. A composite rod or wire which comprises:

A. a first component core selected from the group consisting of aluminum and aluminum base alloys which represents from 70 to 95 percent of the area of the composite;

B. a second component in cladding relationship with said core and selected from the group consisting of copper and copper base alloys; and C. a third component diffusion barrier sandwiched between said first and second components and bonded thereto, and selected from the group consisting of nickel, cobalt and alloys thereof;

D. wherein said second and third components in combination represent from 5 to 30 percent of the area of the composite; and E. said third component represents less than 70 percent of the area of said second component.

2. A composite according to claim 1 wherein said third component is nickel or a nickel base alloy.

3. A composite rod or wire according to claim 1 having a diameter less than three-eighths inch.

4. A composite according to claim 3 having a diameter of from 0.002 to 0.375 inch.

5. A composite according to claim 1 wherein said nickel alloy contains over 15 percent nickel.

* * * * *